Aug. 12, 1941.  E. OETTINGER  2,252,026
AUTOMATIC BATTERY LIQUID FILLER
Original Filed July 27, 1935
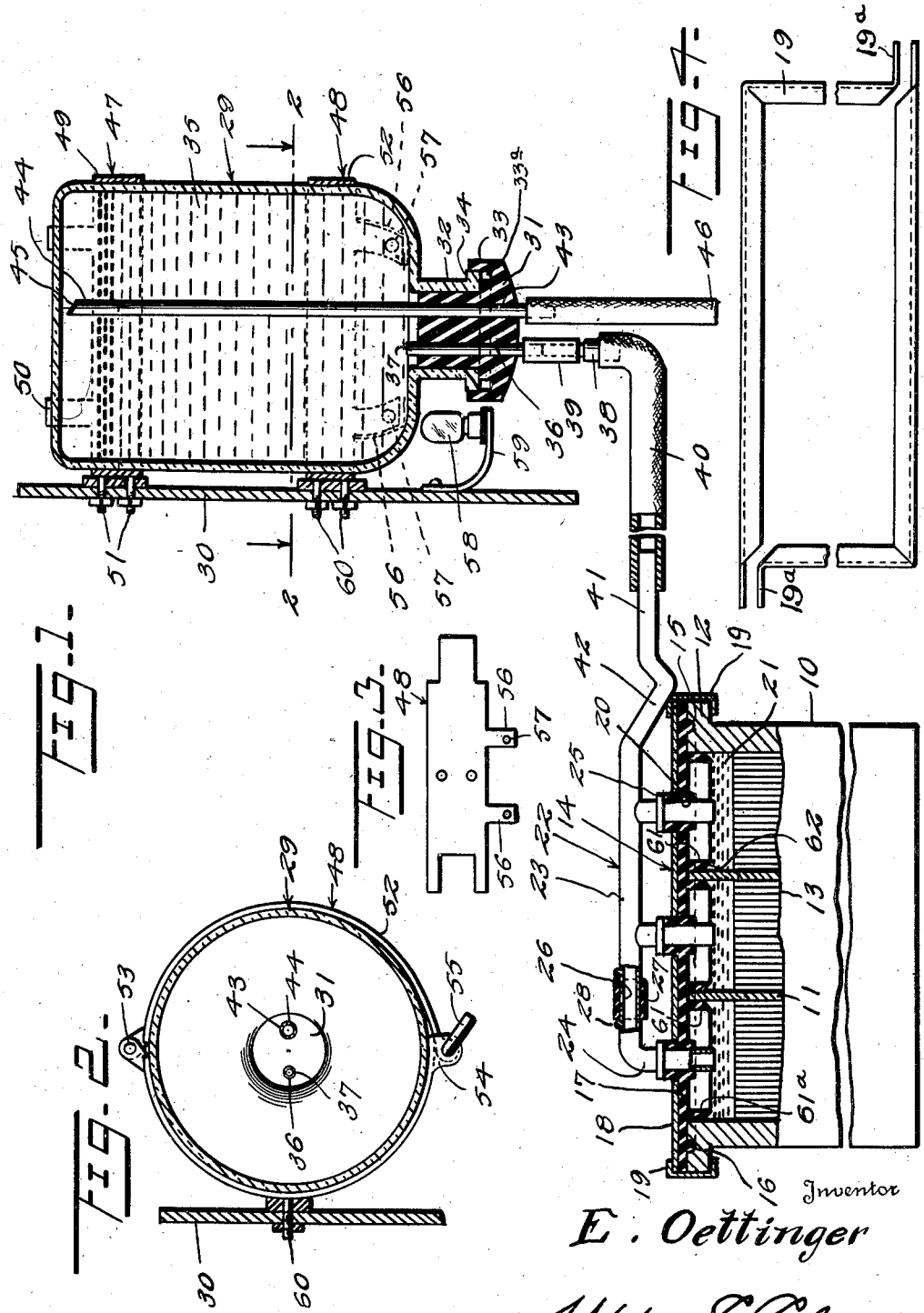
Inventor
E. Oettinger
By Watson E. Coleman
Attorney Patented Aug. 12, 1941

2,252,026

UNITED STATES PATENT OFFICE 2,252,026

AUTOMATIC BATTERY LIQUID FILLER

Emil Oettinger, Chicago, Ill.

Application July 27, 1935, Serial No. 34,895
Renewed August 23, 1939

5 Claims. (Cl. 136—162)

This invention relates to batteries and particularly to such batteries as are carried on automobiles.

The general object of the invention is to provide in connection with a battery which is hermetically sealed against the discharge of gas or fumes therefrom, a reservoir initially containing pure distilled water, and to provide means whereby the water from the reservoir shall be discharged intermittently as needed to the cells of the battery so as to keep the battery plates constantly submerged.

Another object is to provide means whereby any gases, fumes or vapors generated in the cells and which normally escape around the battery posts and around the battery cover, shall be discharged into the reservoir and pass upward through the water to thus acidulate the water in the reservoir, and in this connection to provide means causing the discharge of water electrolyte into the battery as any gases, vapors or fumes collecting in the upper portions of the cells break the liquid seal of the cell and are discharged into the reservoir.

A further object is to cause an electrolyte in all the cells to be of the same strength.

A still further object is to provide means which will act to eliminate the expensive services now necessary such as rebuilding frequent re-filling, re-charging, re-aciding and the frequent removal of the coatings, which as a result of corrosion and leakage, accumulate around the battery terminals, posts and adjacent parts, which action causes a heavy loss of power.

Other objects will appear in the course of the following description.

My invention is illustrated in the accompanying drawing wherein:

Fig. 1 is a vertical section through a battery and corresponding reservoir, the connections between the battery and reservoir being in elevation and partly broken away.

Fig. 2 is a section on the line 2—2 of Fig. 1.

Fig. 3 is a plan view of one of the sections of the bracket holding the supply reservoir to the dashboard.

Fig. 4 is a plan view partly broken away of the cover sealing means.

In the drawing, 10 designates a battery box or casing having the usual plates 13 disposed in cells, defined by partitions 11. The box has a marginal flange 12 formed with a groove 15. Resting on the flange 12 is a cover 14 which overlaps the marginal flange. The underside of the cover 14 has a rib 16 engaging in the groove 15.

This cover is formed of a lower yieldable gasket 17 which is constituted by a rubber "blanket" and by a plate 18 preferably of insulated sheet metal secured as by vulcanizing to the upper face of the rubber blanket 17. In order to provide means for hermetically sealing the lid 14 to the top of the battery box 10, I provide a sealing band, as shown in Fig. 4, formed of two sections 19, the ends of which are welded, soldered or otherwise sealed together, as at 19ª, after the sections have been put in place, so as to prevent unauthorized persons from removing the lid 14, and so as to clamp the lid tightly down on the battery box to prevent any escape of gas or liquid therefrom. The sections 19 are U-shaped in cross-section, as shown in Fig. 1, and engage beneath the flange 12 and over the top of the metal plate 14. The rubber gasket 17 is provided with downwardly extending flanges 61 and 61ª which embrace the upper ends of the partitions 11 and flanges 61ª which engage closely against the wall of the battery box. The rubber gasket 17 also has upwardly extending flanges 20 which fit closely around the battery posts so as to prevent any possible leakage of electrolyte or of gas or fumes around the battery posts or around the connections to the reservoir as will presently appear.

Extending over the top of the battery is a manifold 22, comprising a horizontal portion 23 having vertical extensions 24 extending down into the cells, these extensions 24 having flanges 25 resting upon the upper ends of the flanges 20 so that the extensions 24 extend just below the level of the electrolyte 21. The horizontal portion 23 of manifold 22 has a vent 26 and an elastic band 27 and is engaged about the pipe 23 and covers this vent opening 26. The band is disposed between spaced ribs 28 so as to prevent longitudinal movement of the band.

A liquid reservoir 29 is mounted on the dashboard or any suitable support 30 and is in the form of a large inverted bottle having a stopper 31 disposed in the neck 32 thereof. It is intended that this stopper shall fit very tightly within the neck 32 so that it cannot easily be removed and the stopper is preferably of insulating material. The stopper is shown as having a skirt 33 fitting around the flange 34 of the bottle neck 32 to prevent leakage of water 35 which is disposed in the reservoir 29. The stopper has an opening 36 extending vertically therethrough and a pipe 37 extends through this opening and slightly above the upper end of the stopper so as to be above any sediment which may collect in the lower end of the reservoir. The pipe 37 is connected to a short pipe 38 by a flexible coupling 39 and the lower end of the pipe 38 connects with a flexible pipe or hose 40 having a larger interior diameter than the pipe 37. The other end of the hose 40 is connected to a horizontal extension 41 of manifold 22. This horizontal extension is slightly lower than the plane of the portion 23 of the manifold and is connected thereto by a V-shaped trap having a short leg connected to the extension 41 and a long leg 42 connected to the portion 23 of the manifold. A vent pipe 44 extends through an opening 43 in the stopper and extends up to the top of the reservoir 29. The upper end of this vent pipe is beveled so that the pipe 44 will not be closed by contact with the upper end of the reservoir if the pipe 44 is thrust too far through the stopper 31. A drain hose 46 is connected to the lower end of pipe 44 so that any gases or fumes after passing through the water in the reservoir may be discharged.

The reservoir is shown as being supported from a dash 30 by means of a pair of bands 47—48. The upper bracket consists of an annular band 49 having fingers 50 bent over the top of the reservoir 29. The band 47 is split in the manner shown in Fig. 2 for the band 48 and hinged at a point diametrically opposed to the split so that the reservoir may be readily removed. The band 47 is secured to the dash by means of bolts 51. The lower bracket 48 also comprises an annular split band 52 hinged at 53 and the free end portions of the band are provided with apertured lugs 54 through which a locking pin 55 engages. This band is attached by bolts 60 to the dash and has lugs 56 having cushioning pads 57 for engagement with the curved lower portion of the bottle.

In order to prevent any freezing of the liquid in the reservoir, I provide the lamp bulb 58 on bracket 59 carried by the dash, thus preventing any escape of the liquid in the reservoir freezing in cold weather.

It will be noted that because of the gas-tight and liquid-tight closure which I have provided, any escape of battery liquid or vapor is positively prevented and that the upper portion of the battery constitutes a chamber or series of chambers, one above each cell, which contains gas or vapor in the space above the lower end of the branches 24, and this vapor cannot escape except up through the manifold branches 24. It will be noted that I have no vents, no screw threads, no hard rubber covers, nor any soft sealing compounds which in summer soften and allow the escape of vapor or acid through internal pressure. Thus this battery is positively sealed against the escape of electrolyte or of any gases or vapors which may accumulate above the electrolyte. The battery box is refilled with liquid from the reservoir every time that the car stops and hence the battery plates are always covered with liquid and they and the separators are never exposed and thus can never warp, crack or be injured by exposure. Hence all of the plates wear out uniformly and need no rebuilding and thus the battery will give from 50% to 150% more life and more efficiency. In actual practice, it is found that in the morning the rubber hose 40 is full of acid as is also the extension 41 of the manifold and the right leg of the V-trap 42. When the car is driven, the generator charges the battery and the generation of gas is so great that almost a continuous stream of vapor can be seen to pass through the manifold 22 and up through the rubber tube 40 and up through the water in the reservoir 29. After the car stops, the battery does not cease giving off some gas or vapor but it gives off less and separate bubbles of gas pass up through the electrolyte and this gas or vapor will accumulate within the manifold until sufficient pressure is secured to force the seal at the trap 42. When this has occurred, this accumulated vapor will pass up through the right leg of the trap 42, breaking the seal, and will pass up into the upper portion of the reservoir, and liquid will pass down from the reservoir through the pipes 37 and 40 and through the trap 42 and so into the battery cells. The gas or vapor in the upper portion of the cells never accumulates and escapes in a steady stream but it passes up into the reservoir at intervals allowing the liquid in the reservoir to pass down into the battery at intervals. This action becomes less and less frequent after the car stops but is continuous for some little time in volume enough to send a small stream of liquid from the reservoir over the left bend 42 of the trap and into the cells. Thus, on driving, the fumes or vapors from the battery escape in the form of bubbles and pass up the hose 40 and a certain amount of liquid in the hose or pipe 40 is forced back into the reservoir, but there is always a certain amount of liquid in the hose 40 and the end 41 of the manifold, which liquid falls by gravity down into the V-trap and escapes over the bend 42 and into the cells as already explained. The liquid from the reservoir slowly leaks through the small pipe 37 into the large hose or pipe 40 when the pressure of gas or vapor in the battery is low and the battery is at rest such as at night.

It will be understood that very dense fumes arise in the upper portion of the battery cells. These fumes or vapors of sulphuric acid within the space between the surface of the liquid and the cover will pass up through the tubes 24 into the manifold 23 and then force the seal in the trap 42 and pass into the relatively large tube 40 and thus at intervals pass up through the water. The gases may pass freely up through the water and out through the discharge pipe 44 while the molecules of sulphuric acid will impregnate the water and in time highly acidulate it.

When the battery is connected with the generator of a motor vehicle, after the vehicle motor has been started and run a short while, the charging of the battery by the generator results in the generated gases within the battery forcing the electrolyte upward into the horizontal portion 23 of the manifold at irregular intervals and as the gases escape at intervals and the pressure of the remaining gases within the battery casing becomes less at such intervals, a to and fro irregular movement of the electrolyte from the several cells of the battery is created, thereby causing the electrolyte of the several cells to become thoroughly mixed within the said horizontal portion 23 of the manifold. This electrolyte falls back into the cells upon the dropping of the internal pressure of the cells and upon continued driving the accumulated gases expel all excess fluid within the cells that may have accumulated through repeated refillings of the cells as heretofore explained.

I claim:

1. A battery including a battery box, partitions dividing the box into cells, a cover for the box, means forming part of the cover for hermetically sealing the cover to the box to prevent any possible leakage of gas therefrom, a manifold extending horizontally above the cover and having extensions opening downward into each of the cells and passing through the cover, the lower ends of the extensions being normally slightly immersed in the electrolyte and the cover being hermetically sealed around said extensions, a downwardly discharging reservoir for distilled water, a pipe connection between the lower end of the reservoir and one end of the manifold, there being a V-shaped trap between the pipe connection and the body of the manifold, and a gas vent pipe extending from the upper end of the reservoir downward through the same and discharging exteriorly of the reservoir.

2. A battery including a battery box having partitions dividing it into cells and having a laterally extending marginal flange at its upper end, a cover for the box formed of an inner layer of soft rubber and an outer rigid plate, the rubber layer having apertures and upwardly extending integral annular flanges extending upward through the apertures in the plate, the rubber layer having tight contact with the upper edge face of the battery box and with the upper ends of said partitions, a channel-shaped clamping member extending entirely around the box and embracing the marginal flange thereof and the margin of the cover, a manifold extending horizontally above the top of the box and having extensions extending downward through said annular flanges of the rubber layer, the lower ends of said extensions being normally slightly immersed in the electrolyte, there being an extension for each of said cells, the manifold having a V-shaped trap in its length located beyond the extensions, a downwardly discharging reservoir for distilled water and having a closure for its lower end, a pipe extending downward through said closure, the upper end of the pipe being disposed adjacent the bottom of the reservoir, the pipe being connected to the adjacent end of the manifold, and a gas vent pipe extending from the upper end of said reservoir downward through said closure and discharging exteriorly of the reservoir.

3. A battery including a battery box having partitions dividing it into cells and having a laterally extending marginal flange, a cover for the box formed of an inner layer of soft rubber having downwardly extending flanges embracing the upper edges of the partitions, the layer extending over the upper edge face of the battery box, an outer rigid plate forming part of the cover resting upon the rubber layer and having apertures above each cell of the box, the rubber layer having upwardly extending annular flanges extending through said apertures, a channel-shaped clamping means extending entirely around the box and embracing the marginal flange thereof and the margin of the cover and holding the cover in hermetically sealed engagement with the battery box, a manifold having a horizontal portion disposed above the battery box, this portion having downwardly discharging tubular extensions extending through the annular flanges of the rubber cover and having their lower ends normally slightly immersed in the battery liquid, the manifold adjacent one end extending downward and then upward to form a trap and then horizontally outward, the last named horizontal portion being on a level below the first named horizontal portion whereby the trap is formed with a short leg and a relatively long leg, a reservoir having a downwardly discharging neck, a closure for said neck, a relatively small pipe extending downward through the closure and terminating slightly above the upper end of the closure, a relatively large flexible pipe coupled to the outer end of the first named pipe and engaged at its other end with the horizontal extension of the manifold, and a vent pipe extending downward from the upper end of the reservoir through said closure and discharging exteriorly of the reservoir.

4. A battery including a battery box having partitions dividing it into cells and having a laterally extending marginal flange, a cover for the box formed of an inner layer of soft rubber having downwardly extending flanges embracing the upper edges of the partitions, the layer extending over the upper edge face of the battery box, an outer rigid plate forming part of the cover resting upon the rubber layer and having apertures above each cell of the box, the rubber layer having upwardly extending annular flanges extending through said apertures, a channel-shaped clamping member extending entirely around the box and embracing the marginal flange thereof and the margin of the cover and holding the cover in hermetically sealed engagement with the battery box, a manifold having a horizontal portion disposed above the battery box, this portion having downwardly discharging tubular extensions extending through the annular flanges of the rubber cover and having their lower ends normally slightly immersed in the battery liquid, this portion of the manifold having a vent opening, and an elastic sleeve normally closing said vent opening but forced to a position relieving said vent upon an excess of pressure in the manifold, the manifold adjacent one end extending downward and then upward to form a trap and then horizontally outward, the last named horizontal portion being on a level below the first named horizontal portion whereby the trap is formed with a short leg and a relatively long leg, a reservoir having a downwardly discharging neck, a closure for said neck, a relatively small pipe extending downward through the closure and terminating slightly above the upper end of the closure, a relatively large flexible pipe coupled to the outer end of the first named pipe and engaged at its other end with the horizontal extension of the manifold, and a vent pipe extending downward from the upper end of the reservoir through said closure and discharging exteriorly of the reservoir.

5. In a battery including a casing divided into cells, a cover closing the casing, a reservoir, a manifold tube over the cover and having tubular extensions leading into said cells, a pipe connection between the reservoir and the manifold, and a substantially V-shaped trap tube joining the pipe with the manifold.

EMIL OETTINGER.